United States Patent Office  
3,395,067  
Patented July 30, 1968

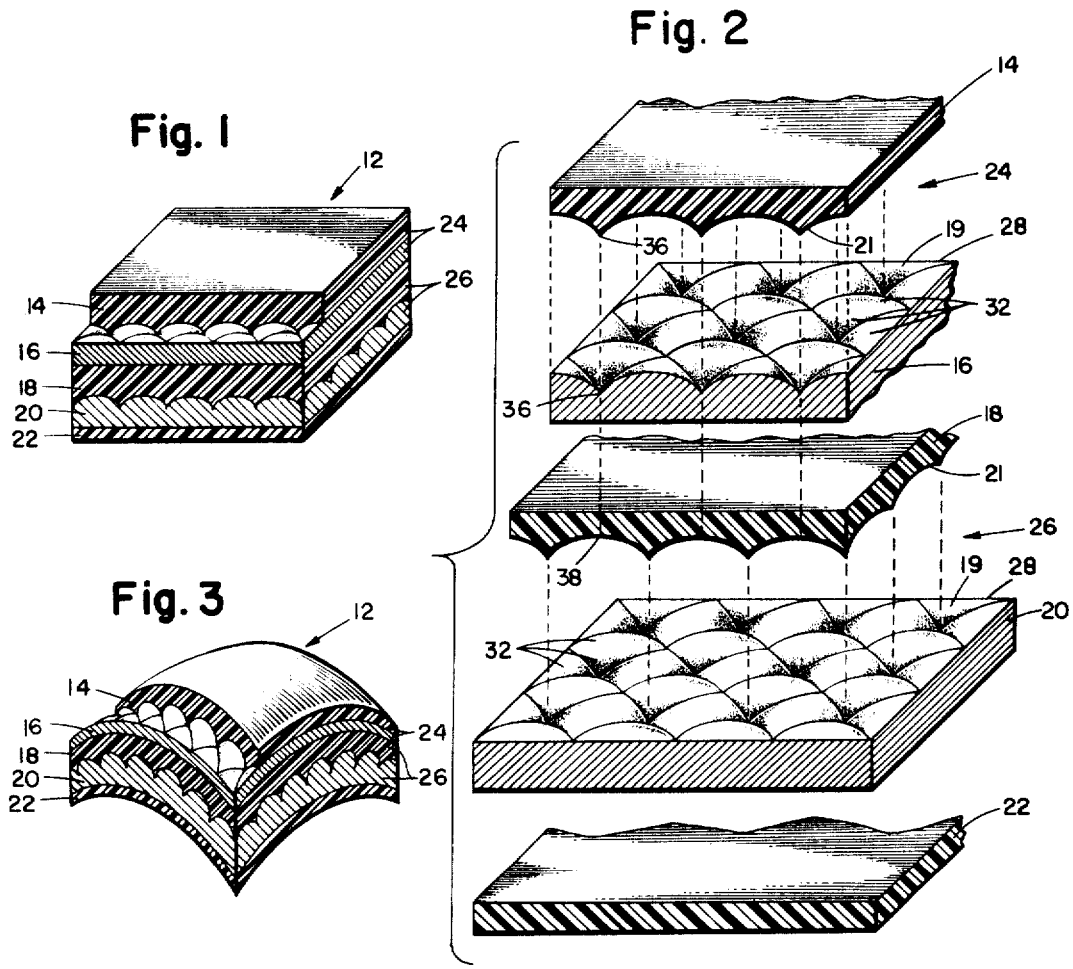

---

3,395,067
COMPOSITE LAMINATED ARMOR PLATE WITH INTERNAL PROJECTILE-DEFLECTING SURFACES
Edward K. Lane, Jr., Claremont, Calif., assignor to Aerojet-General Corporation, Azusa, Calif., a corporation of Ohio
Filed Oct. 12, 1964, Ser. No. 403,232
8 Claims. (Cl. 161—119)

ABSTRACT OF THE DISCLOSURE

This disclosure concerns a composite armor plate of laminated construction for protecting an area against projectiles travelling at high velocities. The composite armor plate comprises respective pairs of layers of dissimilar materials having relatively high compressive strength to density ratios, but of differing hardness. The layers in each pair of layers have adjoining surfaces bonded together in intimately contacting, mating engagement throughout the entire areas thereof. Convex pyramidal protuberances are formed on the adjoining surface of one layer and are matingly received in complementary pyramidal-shaped cavities formed in the adjoining surface of the other layer. The interface between the pair of layers thereby provides multiple projectile-deflecting surfaces tending to deflect a projectile from its path of flight as the projectile encounters such deflecting surfaces in penetrating into the composite armor plate.

---

My invention relates to armor plate and more particularly to an improved armor plate having multiple deflection surfaces in a laminate form.

The purpose of an armor plate is to protect men and equipment from projectiles by acting as a barrier. When the projectiles strike and penetrate such a plate, their destructive force is diminished by consumption of kinetic energy required to traverse the plate and, the greater the traverse, the greater the consumption of energy. Conventionally, such traverse depends primarily on thickness of plate. Thus, protection is obtained by increasing the plate thickness. But, as the thickness increases, the weight of plate also increases. This increased weight, besides adding to the cost of manufacture, has the serious disadvantage of making the weapon, such as a tank, cumbersome and slow. If the tank travels too slowly, it becomes an easy target. It is obvious, therefore, that there must be some compromise between weight and mobility for maximum protection.

One solution to the weight problem has been to provide a composite plate of two or more materials sandwiched into a unit whereby the several materials contribute to increase the protective efficiency. For example, the materials may be of different densities so that the planes at which the materials join act as planes of deflection to cause a projectile to travel diagonally through the plate. Although a composite plate can offer greater protection than a plate of a single material, the same problems of thickness and weight are similarly disadvantageous.

Another form of armor plate comprises a base member or plate having deflecting particles embedded therein. If these particles are randomly embedded in the base member, their ability to change the direction of travel of projectiles is uncertain and, therefore, they do not afford maximum protection. If the particles are deposited in orderly fashion within the base member, the cost of manufacturing such plates necessarily increases, making an armor plate having particularly positioned deflecting particles embedded therein an expensive item.

In its simplest form, this invention contemplates a pair of layers of armor plate material having adjoining surfaces. Each surface is formed as a series of pyramids whose triangular faces are curved. The triangular faces of one surface are concave while the triangular faces of the other surface are convex to provide for a mating relationship between the adjoined surfaces. In the present embodiment, a second pair of layers having similar surfaces is bonded to the first pair, but in such a way that the pyramidal surface of one pair is offset from the pyramidal surface of the second pair. This configuration provides for a very large number of deflecting surfaces. In addition, the layers are formed from two materials in alternating relationship, i.e., the first and third layers are formed from one material, while the second and fourth layers are formed of a different material. Both materials have a high compressive strength to density ratio; however, one material is harder than the other. The hardness in conjunction with the pyramidal surfaces acts to deflect and change the direction of a projectile which may strike the composite plate. A fifth layer may be secured to one of the pairs on the side of the plate intended to be opposite from the outer surface of the composite plate structure.

Accordingly, it is an object of this invention to provide an improved armor plate capable of better dissipation of the energy in a projectile fired thereinto.

It is another object of this invention to provide a more efficient composite armor plate in a laminate of predetermined configuration.

It is a further object of this invention to provide an armor plate structure including novel deflecting means integral with the plate to afford internal deflection of projectiles fired into the plate.

These and other objects of this invention will appear from the following specification describing preferred embodiments thereof.

The embodiments shown are not to be construed as limiting the scope of the invention thereto, since in view of the disclosure herein, others may be able to make additional embodiments within the scope of the appended claims.

In the drawings:

FIGURE 1 is an isometric view of a cut-away segment of an armor plate according to this invention;

FIGURE 2 is an exploded view of the segment shown in FIGURE 1, and

FIGURE 3 is a curved plate similar to the segment of FIGURE 1.

Referring now to FIGURES 1 and 2 taken together, laminated segment 12 of the novel armor plate of this invention comprises five layers 14, 16, 18, 20, and 22. Layers 14 and 16 form pair 24, while layers 18 and 20 form pair 26. Preferably, layers 16 and 20 comprise a material which is harder than the materials of layers 14, 18 and 22. The materials of the harder layers may comprise cast ceramic or sintered material, while that of the other three comprises a fiber or filler reinforced polymer or elastomer. The several layers are bonded together as shown in FIGURES 1 and 3 to form a composite armor plate. Layer 14 is intended to serve as the outside layer while layer 22 may serve as the inside layer of the composite plate.

With particular reference to FIGURE 2, layers 16 and 20 are provided with surfaces 28 formed of a series of indentations 19, while layers 14 and 18 are provided with a surface comprising a series of protuberances 21. Both indentations 19 and protuberances 21 are formed as pyramids having triangular sides 32. The sides are further curved to form, preferably, triangles with parabolic or spherical sides; however, it is to be understood that the curvature of the faces of the triangles may assume any curved surface configuration. For purposes of illustration, the pyramids have a square base, although it is obvious that any polygonal shape will suffice. It has been found that the base need not comprise more than a hexagon, since a six-sided pyramid performs quite satisfactorily for the intended function of deflecting any projectile which may breach the surface of the armor plate.

To insure maximum efficiency of the plate, the surfaces between layers 14 and 16 are displaced or offset from the surfaces between layers 18 and 20 so that the mating apex and nadir points 36 are aligned with the mating trough and crest areas 38 in the surfaces of layers 18 and 20.

When a projectile breaches the surface of layer 14, instead of passing directly through segment 12 of the armor plate, it will be deflected within the plate upon hitting one or several triangular sides 32 and thereby be caused to traverse a greater thickness of plate than if it had not been deflected. Thus, the plate need not be as thick as a single material or a plate comprising a single composite plate.

As shown in FIGURE 3, the entire laminate segment 12 may have a curved configuration, as may be the case when formed as a vehicle body surface or vessel hull.

The surface purvature of 12 illustrated in FIGURE 3 is shown as a section of a solid of revolution, but may have any surface curvature of convex or concave paraboloid or hyperboloid configuration.

While the foregoing is a description of preferred embodiments, the claims which follow are intended to include such modifications and variations which may be within the spirit and scope of my invention.

I claim:

1. An armor plate for protecting an area against projectiles travelling at high velocities by resisting the penetration thereof, said armor plate comprising a pair of layers having adjoining surfaces, one of said layers having a plurality of convex protuberances formed on its respective adjoining surface, said convex protuberances being arranged in a uniform pattern of widthwise and lengthwise rows of said protuberances across the entire area of said adjoining surface, the other of said layers having a plurality of concave indentations formed on its respective adjoining surface corresponding to said convex protuberances on the adjoining surface of said one layer and complementary thereto, said concave indentations being arranged in a uniform pattern of widthwise and lengthwise rows of said indentations across the entire area of said adjoining surface of said other layer, said protuberances formed on the adjoining surface of said one layer being respectively received by the corresponding indentations formed in the adjoining surface of said other layer in mating relationship therewith, the respective adjoining surfaces of said pair of layers being bonded together in intimately contacting, matnig engagement throughout the entire areas thereof so as to provide a continuous interface between said pair of layers defined by said protuberances and said indentations, and said pair of layers cooperating to define a composite laminated armor plate structure which resists penetration of a projectile by tending to deflect the projectile from its path of flight as the projectile passes partially through the composite laminated armor plate structure so as to encounter the interface of said pair of layers.

2. An armor plate as set forth in claim 1, wherein said one layer is of a fiber reinforced elastomeric material, said other layer being of a ceramic material having a hardness greater than that of said fiber reinforced elastomeric material of said one layer, and both said fiber reinforced elastomeric material of said one layer and said ceramic material of said other layer having a relatively high compressive strength to density ratio.

3. An armor plate for protecting an area against projectiles travelling at high velocities by resisting the penetration thereof, said armor plate comprising a pair of layers having adjoining surfaces, one of said layers being of non-metallic material, the other of said layers being of a material having a hardness greater than that of the material of said one layer, both of said layers having a relatively high compressive strength to density ratio, said one layer having a plurality of convex protuberances formed on its respective adjoining surface, said convex protuberances being arranged in a uniform pattern across the entire area of said adjoining surface and respectively comprising individual pyramids having a plurality of triangular sides with a uniform surface curvature, said other layer having a plurality of concave indentations formed on its respective adjoining surface corresponding to said convex protuberances on the adjoining surface of said one layer and complementary thereto, said concave indentations being arranged in a uniform pattern across the entire area of said adjoining surface of said other layer and respectively comprising individual pyramidal-shaped cavities having a plurality of triangular sides with a uniform surface curvature, and said pyramids formed on the adjoining surface of said one layer being respectively received by the corresponding cavities formed in the adjoining surface of said other layer in mating relationship therewith, the respective adjoining surfaces of said pair of layers being bonded together in intimately contacting, mating engagement throughout the entire areas thereof so as to provide a continuous interface between said pair of layers defined by said pyramids and said cavities, and said pair of layers cooperating to define a composite laminated armor plate structure which resists penetration of a projectile by tending to deflect the projectile from its path of flight as the projectile passes through materials of differing hardness and encounters deflecting surface curvatures at the interface of said pair of layers.

4. An armor plate for protecting an area against projectiles travelling at high velocities by resisting the penetration thereof, said armor plate including a base layer and a pair of laminar components bonded to each other and to said base layer to comprise a composite laminated armor plate structure, each of said laminar components comprising a pair of layers having adjoining surfaces, one of said layers having a plurality of convex protuberances formed on its respective adjoining surface, said convex protuberances being arranged in a uniform pattern of widthwise and lengthwise rows of said protuberances across the entire area of said adjoining surface, the other of said layers having a plurality of concave indentations formed on its respective adjoining surface corresponding to said convex protuberances on the adjoining surface of said one layer and complementary thereto, said concave indentations being arranged in a uniform pattern of widthwise and lengthwise rows of said indentations across the entire area of said adjoining surface of said other layer, said protuberances formed on the adjoining surface of said one layer being respectively received by the corresponding indentations formed in the adjoining surface of said other layer in mating relationship therewith, and the respective adjoining surfaces of said pair of layers being bonded together in intimately contacting, mating engagement throughout the entire areas thereof so as to provide a continuous interface between said pair of layers defined by said protuberances and said indentations, whereby said composite laminated armor plate structure resists penetration of a projectile by tending to deflect the projectile from its path of flight as the projectile passes partially through the composite laminated armor plate structure so as to successively encounter the respective interfaces of said pair of layers for each of said laminar components.

5. An armor plate as set forth in claim 4, wherein the protuberances and indentations defining the continuous interface between the pair of layers comprising one of said laminar components are offset with respect to the protuberances and indentations defining the continuous interface between the pair of layers comprising the other of said laminar components so as to provide a staggered relationship therebetween.

6. An armor plate as set forth in claim 5, wherein said one layer of each of said laminar components is of non-metallic material, said other layer of each of said laminar components being of a material having a hardness greater than that of the material of said one layer corresponding thereto, both of said layers of each laminar components having a relatively high compressive strength to density ratio, and said pair of laminar components being arranged with the respective pairs of layers thereof being disposed in an alternating sequence between said one layer and said other layer such that each successive layer of said composite laminated armor plate structure is of a material differing in hardness with respect to the preceding layer.

7. An armor plate as set forth in claim 6, wherein said one layer of each of said laminar components and said base layer respectively comprise a fiber reinforced elastomer, and said other layer of each of said laminar components comprises a ceramic material.

8. An armor plate for protecting an area against projectiles travelling at high velocities by resisting the penetration thereof, said armor plate including a base layer and a pair of laminar components bonded to each other and to said base layer to comprise a composite laminated armor plate structure, each of said laminar components comprising a pair of layers having adjoining surfaces, one of said layers being of non-metallic material, the other of said layers being of a material having a hardness greater than that of the material of said one layer, both of said layers having a relatively high compressive strength to density ratio, said one layer having a plurality of convex protuberances formed on its respective adjoining surface, said convex protuberances being arranged in a uniform pattern across the entire area of said adjoining surface and respectively comprising individual pyramids having a plurality of triangular sides with a uniform surface curvature, said other layer having a plurality of concave indentations formed on its respective adjoining surface corresponding to said convex protuberances on the adjoining surface of said one layer and complementary thereto, said concave indentations being arranged in a uniform pattern across the entire area of said adjoining surface of said other layer and respectively comprising individual pyramidal-shaped cavities having a plurality of triangular sides with a uniform surface curvature, and said pyramids formed on the adjoining surface of said one layer being respectively received by the corresponding cavities formed in the adjoining surface of said other layer in mating relationship therewith, the respective adjoining surfaces of said pair of layers being bonded together in intimately contacting, mating engagement throughout the entire areas thereof so as to provide a continuous interface between said pair of layers defined by said pyramids and said cavities, and said pair of laminar components being arranged with said other layer of a material of greater hardness in one of said laminar components being disposed in bonded engagement with said one layer of a non-metallic material in the other of said laminar components, whereby said composite laminated armor plate structure resists penetration of a projectile by tending to deflect the projectile from its path of flight as the projectile passes through materials of differing hardness and encounters deflecting surface curvatures at the interface of said pair of layers in each of said laminar components.

References Cited

UNITED STATES PATENTS

| | | | |
|---|---|---|---|
| 893,288 | 7/1908 | Walters | 109—84 |
| 2,384,594 | 9/1945 | Bierman | 109—81 |
| 2,768,919 | 10/1956 | Bjorksten et al. | 161—404 |
| 1,610,581 | 12/1926 | O'Shaughnessy | 161—120 |

MORRIS SUSSMAN, *Primary Examiner.*